(No Model.)
C. F. DINKLE.
FERTILIZER PULVERIZER AND DISTRIBUTER.
No. 298,186. Patented May 6, 1884.
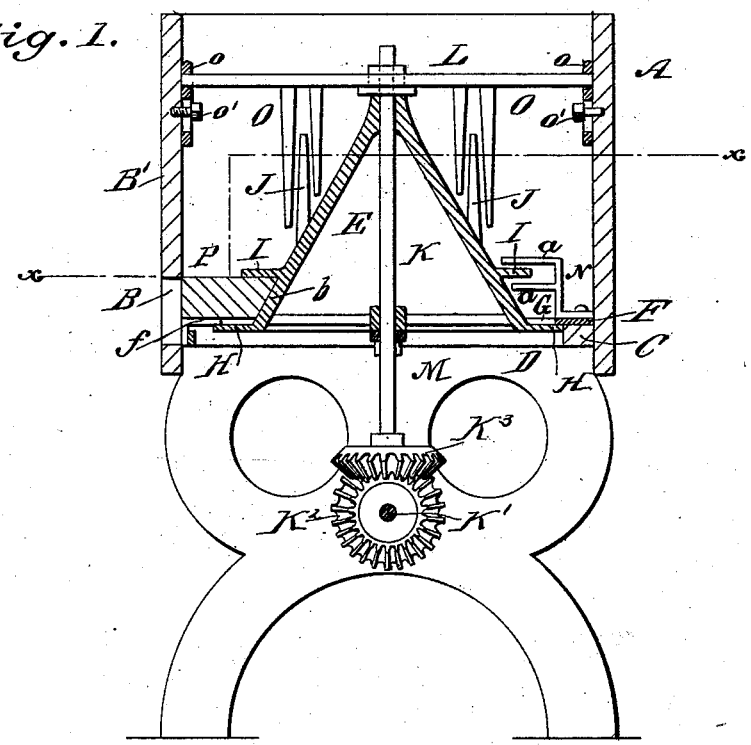
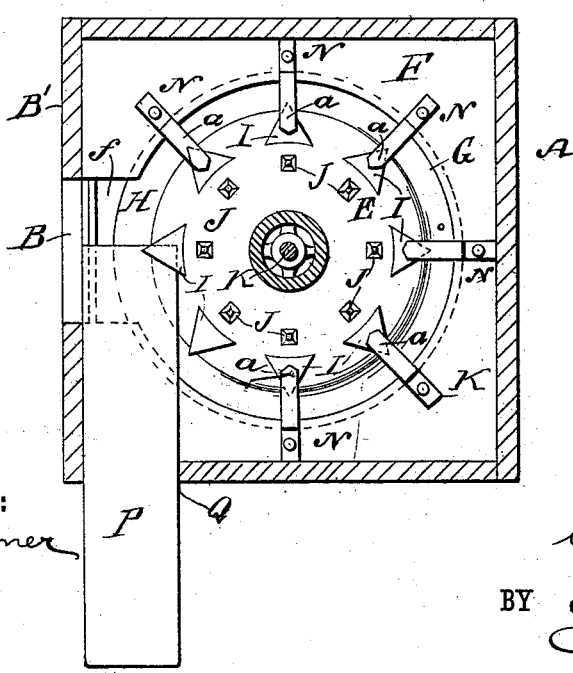
WITNESSES:
INVENTOR:
C. F. Dinkle
BY Munn & Co.
ATTORNEYS.

UNITED STATES PATENT OFFICE.

CHARLES FREDERICK DINKLE, OF CARLISLE, PENNSYLVANIA.

FERTILIZER PULVERIZER AND DISTRIBUTER.

SPECIFICATION forming part of Letters Patent No. 298,186, dated May 6, 1884.

Application filed January 21, 1884. (No model.)

*To all whom it may concern:*

Be it known that I, CHARLES F. DINKLE, of Carlisle, Cumberland county, Pennsylvania, have invented a new and Improved Fertilizer Pulverizer and Distributer, of which the following is a full, clear, and exact description.

The object of this invention is to provide a simple and comparatively cheap device for pulverizing and distributing phosphates, guano, &c.; and the invention consists of the construction, arrangement, and combination of parts, all as hereinafter described and claimed.

Reference is to be had to the accompanying drawings, forming part of this specification, in which similar letters of reference indicate corresponding parts in both figures.

Figure 1 is a vertical sectional elevation of my invention, and Fig. 2 is a sectional plan view thereof taken on the line $x\ x$, Fig. 1.

A is the hopper, in which the fertilizer to be pulverized is placed, and this hopper is made, preferably, of wood, with the discharge-opening B. The wooden bottom C of the hopper A has a large circular opening, D, made through it, which receives the cone E and flange H thereof, and said bottom C is covered upon the inside with a metal plate, F, which also has a large circular opening, G, made in it, which is of less diameter than the opening D and flange H of the cone, so that the plate F will overlap the said flange H, as shown in Fig. 1. The plate F has also a horizontal opening, $f$, corresponding with the discharge-opening B, exposing the flange H of the cone E to the action of the scraper P. The cone E, besides being formed with the flange H, is formed with the series of horizontal pulverizing or breaking arms I and series of vertical breaking-arms J, and is made fast to the vertical shaft K, journaled in the upper and lower cross-pieces, L M, to which shaft motion is to be imparted from shaft K' and gear-wheels K² K³, which will cause the cone E to revolve in the hopper A.

N N are stationary breakers secured upon the bottom plate, F, so as to act in conjunction with the series of horizontal arms I; and O O are stationary breaking-arms formed upon or secured to the cross-piece L, so as to act in conjunction with the vertical arms J of the cone E. The stationary breakers N are angle-plates formed with the two horizontal arms $a\ a$, between which the series of arms I of the cone E pass, as shown clearly in Fig. 1, while the pendent arms O O are plain arms or long spikes of iron arranged in pairs, so that the vertical arms J pass between them, as shown more clearly in Fig. 1, and they are adapted to be adjusted vertically by raising or lowering the slotted plates $o\ o$, which hold the ends of the cross-piece L, and which are held to the inner walls of the hopper A by the bolts or screws $o'\ o'$.

P is a wooden bar passed through an opening, Q, made in one side of the hopper A, and reaches past the discharge-opening B, so that by moving the bar endwise the discharge of the material being pulverized in the hopper may be regulated, and the inner edge of the bar P is beveled, as shown at $b$, Fig. 1, to correspond with the inclination of the outer surface of the cone E, and the bar is of such a width and thickness relative to the distance between the side wall, B', of the hopper A and the cone E and the distance of the horizontal arms I above the bottom plate, F, that it acts as a scraper to the cone and flange H, and as a stop or guide to cause the material being treated to pass out of the discharge-opening B.

In use the material to be pulverized will be placed in the hopper A and motion will be imparted to shaft K', which, through gears K² K³ and shaft K, will cause the cone E to revolve, which will cause the arms I and J and the stationary arms N O to agitate and pulverize the material and cause it to pass out the opening B thoroughly disintegrated.

Constructed in the manner described it will be seen that by forming the flange H upon the cone E, the bottom of the hopper A is partly closed thereby, so that, in connection with the wooden bottom and the plate F, a perfect yet cheap and practical bottom is formed for the hopper, so that no material can escape from the hopper except at the opening B. Besides, owing to the construction and arrangement of the breaking-arms, the device is very effective in its pulverizing action, and the whole is strong, durable, practical, and cheap; and it is designed to attach the pulverizer to machines used for planting seeds, the attachment to be made in such manner that the fertilizer will pass from the pulverizer into and go with the seed discharged from the planter.

Having thus described my invention, I claim as new and desire to secure by Letters Patent—

1. In a device for pulverizing fertilizers, the vertically-revolving cone E, formed with the flange H, which partially closes the hopper A, substantially as described.

2. The vertically-revolving cone E, formed or provided with the horizontal arms I and vertical arms J, substantially as described.

3. The vertically-revolving cone E, having horizontal projections I and vertical projections or arms J, in combination with the horizontal stationary breakers N, and the pendent arms O, arranged to operate substantially as described.

4. The combination, with the cone E, provided with arms I J, of the stationary breakers N, and pendent arms O, arranged to operate substantially as described.

5. The combination, with the cone E, of the adjustable scraper P, with an inner beveled face resting against the side of the cone, near its base, arranged to operate substantially as described.

6. The cross-piece L, provided with the adjusting-arms o o' and pendent arms O, in combination with the cone E, having the vertical and horizontal arms I J, and the stationary breakers N, substantially as and for the purpose set forth.

7. The combination, with the vertically-revolving cone E, having vertical and horizontal agitating and crushing arms I J, and formed with flange H, of the hopper A, having pendent arms O, and horizontal breakers or crushers N, and the plate F, having circular opening G and side opening, f, and arranged to overlap the flange H of the cone, substantially as shown and described.

CHARLES FREDERICK DINKLE.

Witnesses:
LEMUEL BIESTLINE,
WM. H. DINKLE.